United States Patent [19]

Maizlish et al.

[11] Patent Number: 4,668,029

[45] Date of Patent: May 26, 1987

[54] STACKABLE, PORTABLE FILING CABINET MODULES

[76] Inventors: Bernard L. Maizlish, Williams Island, Apt. 802, 17801 NE. 33rd Pl., N. Miami Beach, Fla. 33160; Stanley J. Cardiges, 17 Southern Woods, Irvine, Calif. 92715; Charles D. Hayes, 7936 Cross Creek Dr., Glen Burnie, Md. 21061

[21] Appl. No.: 829,956

[22] Filed: Feb. 18, 1986

[51] Int. Cl.⁴ .............................................. B60B 33/06
[52] U.S. Cl. ........................................ 312/250; 16/32
[58] Field of Search ............................ 280/35, 43, 24; 292/225, 125, 141, 171; 16/32, 33; 312/184, 250; 190/18 A

[56] References Cited

U.S. PATENT DOCUMENTS

| | | | |
|---|---|---|---|
| 129,354 | 7/1872 | McAfferty | 16/32 |
| 446,997 | 2/1891 | Stroh et al. | 292/141 |
| 1,221,750 | 4/1917 | Laird | 16/33 |
| 1,812,890 | 7/1931 | McWhorter | |
| 2,605,161 | 7/1952 | Shampaine | 312/184 |
| 2,767,420 | 10/1956 | Riccio | 16/33 |

FOREIGN PATENT DOCUMENTS 637813  4/1962  Italy ..................................... 312/250

*Primary Examiner*—Joseph Falk
*Attorney, Agent, or Firm*—John F. McClellan, Sr.

[57] ABSTRACT

A module of a filing cabinet houses in a pivotal-lid covered filing cabinet a pendent file. Four castors at respective corners retract upward into the housing for providing compact, fixed-location, vertically stackable storage of a plurality of such modules. With the castors extended a module can be drawn along behind the user at the end of a length of line, transporting heavy loads of documents held in the pendent file. A lever-powered spring-biased system actuated by lines holds the castors up-or-down as desired, and a key-lock may be used to secure the lid.

1 Claim, 5 Drawing Figures

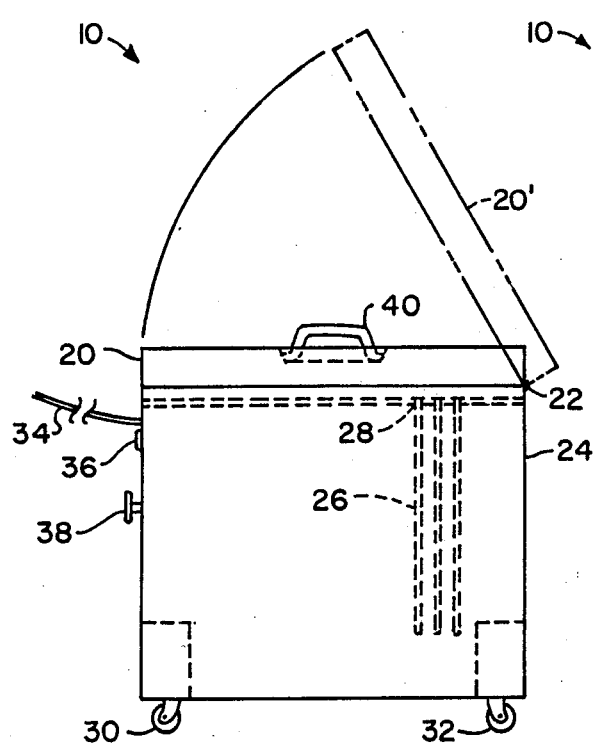
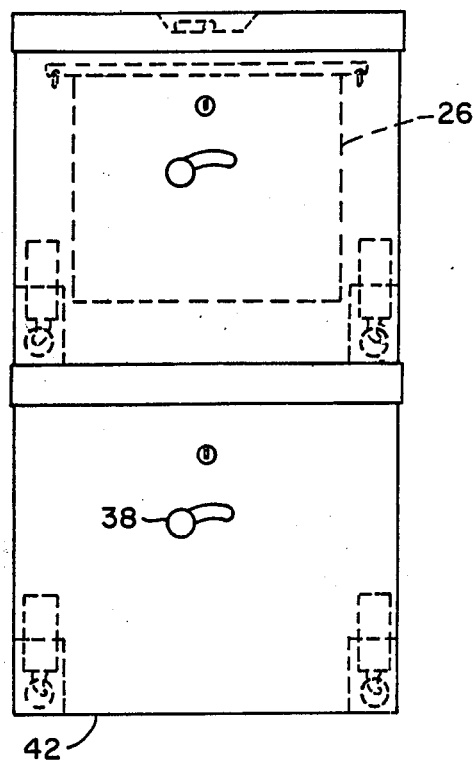
FIG. 1
FIG. 2
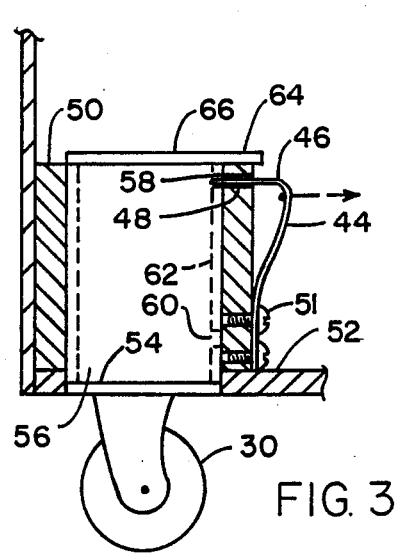
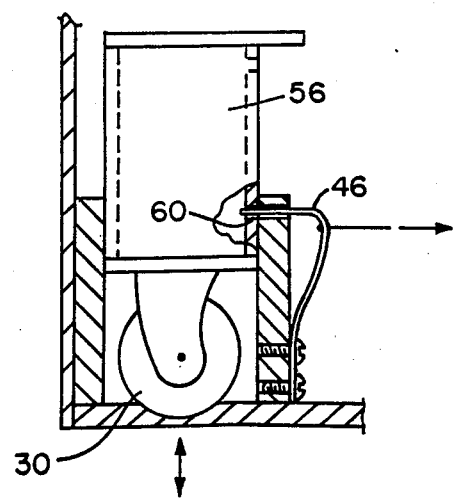
FIG. 3
FIG. 4

STACKABLE, PORTABLE FILING CABINET MODULES

FIELD OF THE INVENTION

This invention relates generally to storage devices and particularly to a storage cabinet of the document filing type.

PRIOR ART

The usefulness of retractable-wheel furniture has been recognized, as in U.S. Pat. No. 1,812,890 issued to A. E. McWhorter on 7-7-36 for "Combined Tool Cabinet and Workbench" with pivotally retractable wheels.

SUMMARY OF THE INVENTION

However, no device of the type is known that provides the advantages of the present invention in filing documents, in portability and in stackability for compact storage, using the relatively heavy but convenient and protective pendent type files.

The present invention has been called a "LAWYERS' DOG" and in a prototype embodiment has proved easy to use and to transport documents in, while affording good access to contents and protection for them.

In brief summary given as cursory description only and not as limitation, a module of a filing cabinet houses in a pivotal-lid covered filing cabinet a pendent file. Four castors at respective corners retract upward into the housing for providing compact, fixed-location vertically stackable storage of a plurality of such modules. With the castors extended a module can be drawn along behind the user at the end of a length of line, transporting heavy loads of documents held in the pendent files. A lever-powered spring-biased system actuated by lines holds the castors up-or-down as desired, and a key-lock may be used to secure the lid.

BRIEF DESCRIPTION OF THE DRAWINGS

The above and other objects and advantages of this invention will become more readily apparent on examination of the following description, including the drawings in which like reference numerals refer to like parts.

FIG. 1 is a side elevational view of a typical module of a preferred embodiment of the invention, with castors extended;

FIG. 2 is a front elevational view of two of the modules, with castors retracted for stacking;

FIG. 3 is a fragmentary, partly sectional detail, on an enlarged scale, of a castor with latch holding it in extended position;

FIG. 4 is a similar elevational view with latch holding the castor in retracted position.

DETAILED DESCRIPTION

Figure 5:
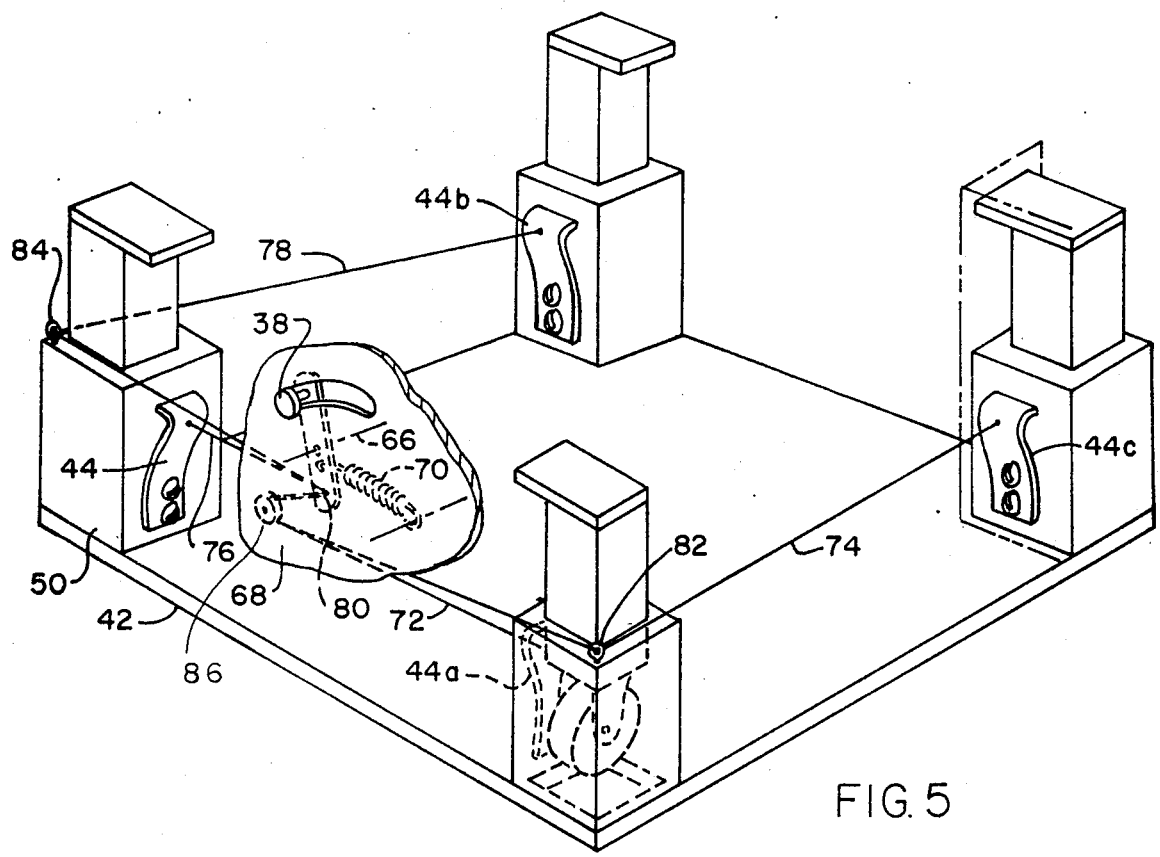
FIG. 5 is a perspective view of the bottom plate of the module carrying the castor assemblies, with a front wall fragment shown carrying the actuating lever assembly.

FIG. 1 shows the side view of embodiment 10 of the invention, a box-like module with a top 20 hinged at 22 to the back 24. Broken lines 20' show the top raised to give access to typical pendent file folders 26 such as PENDAFLEX ™ files held by the customary steel supports, 28 shown.

A few holders appear. The means shown provide for filing many more. Weight of this type file is significantly greater than for conventional drop-in but because castors 30, 32 shown are supplied at the bottom corners, a fully loaded module 10 can be towed around with little effort by a rope 34. The rope may be passed through a hole and knotted. Salesmen, lawyers and others who must move documents in quantity from place to place will find this most useful and convenient.

A simple hook-and-eye key-actuated lock 36 of any conventional type serves to secure the top 20 in closed position.

A lever 38 actuates the castor mechanism to permit retracting or extending the castors 30, 32 shown.

To provide for picking up the module 10 at a central location for stacking, or for extending the castors as will be described, a flush handle 40 of any coventional type, is supplied in the center of the top 20. The handle may be recessed and/or may fold.

FIG. 2 shows, in front elevational view, that when the castors are retracted, by the lever 38 provided for the purpose, the bottom 42 of the module 10 becomes flush. The modules then will not roll and can be stacked as shown, in any reasonable number. The file folders 26 in the uppermost module are always accessible.

Construction may be of aluminum or steel or plastic, welded or riveted. As an example of size, the module 10 may be a cube, twenty-four inches (60 cm) on a side.

FIG. 3 shows how a flat-spring latch 44 of inverted "L"-shape with the cross-arm part 46 or retractable member inserted through a slot 48 in upper part of the fixed tubular vertical guide 50 and with the vertical part 52 screwed to the fixed tubular vertical guide 50 as by screws 51 serves as means for holding the castors selectively at first or second position. Each castor 30 is pivotally attached to the bottom 54 of a square-section vertical way 56 of tubular stock proportioned for sliding fit in the tubular guide 50. Way 56 has two slots 58, 60 or apertures of any suitable form in or through a wall 62, one above the other.

When the flat-spring latch cross-arm part 46 of the "L"-shaped spring engages the lower slot 60, it holds the castor in extended position, as shown. When a retractive force is applied to member 44 (arrow), to overcome the resilient urging opposing retracting, the flat spring cross arm portion 46 retracts, so that the module 10 can sink and the castors can be held in the retracted position.

The lip 64 that extends as part of the horizontal cover 66 fixed laterally over the upper end of the guide 50 stops the castor way 56 from dropping beyond the extended position during adjustment from the retracted position to the extended position. For this, the module is simply lifted and the lever (that was shown at 38, FIGS. 1 and 2) is actuated to un-latch the castor assemblies and then is released to hold them after they drop.

FIG. 4 shows the castor 30 held in the retracted position by engagement of the cross arm 46 of the latch with the lower slot 60 of the way 56. As noted, to restore the castor to the extended position, the castor way is released from the latch and dropped while suspended above the floor by the user's lifting with the centrally located handle in the top.

FIG. 5 shows how all flat-spring latches 44, 44a, 44b, 44c are simply but positively actuated at the same time.

All castor assemblies are supported on the bottom 42. When lever 38 is pivoted to the right about pivot axis 66 in the front wall 68 against the force of retaining tension spring 70 below the pivot 66, that secures the lever 38, to the wall 68, four lines 72, 74, 76, 78 are pulled simultaneously, one to each latch 44, 44a, 44b, 44c.

The four lines are secured at 80 to the lever 38, below the pivot. Two (74, 78) extend through eyes 82, 84 fixed to the upper end of the guides (50 indicated) at the front of the module and then to forward facing latches on the rear castor assemblies, and two (76, 72) connect with latches 44a, 44 facing each other respectively on the front castor assemblies, 76 directly and 72 (as with 78) over pulley 86 on the front wall 68.

This invention is not to be construed as limited to the particular forms disclosed herein, since these are to be regarded as illustrative rather than restrictive. It is, therefore, to be understood that the invention may be practiced within the scope of the claim otherwise than as specifically described.

What is claimed and desired to be protected by U.S. Letters Patent is:

1. In a cabinet for use on a supporting surface and having a bottom and a top, a plurality of castors, means for extending the plurality of castors from a first position in which the cabinet bottom rests on the supporting surface to a second position in which the plurality of castors support the cabinet, means for retracting the plurality of castors from said second position in which they support the cabinet to said first position in which the cabinet bottom rests on said supporting surface, the improvement comprising: means for suspending vertical files for documents in the cabinet, said top being movably attached to the cabinet for access to said means for suspending vertical files, said means for extending and means for retracting including: a plurality of vertical ways, a corresponding plurality of vertical guides, the vertical guides being rectangular-section tubes and each vertical way having a guide slidably fitted therein, each vertical way having at the lower end thereof a respective castor, a plurality of retractable means for holding the castors selectively at said first position and at said second position, each retractable means for holding being and "L"-shaped spring having one leg affixed to a respective vertical guide and the other leg of the "L"-shape extending through an opening in said vertical guide and selectively engaging structure defining a first aperture in the vertical way in said first position and engaging structure defining a second aperture in the vertical way in said second position; means for simultaneously releasing all said means for holding, including: a lever, a first eyelet and a second eyelet, a plurality of lines, the cabinet having two front corners and two rear corners, the lever being pivotally attached to the front of the cabinet, a said castor, vertical way, vertical guide and retractable means for holding at each of said corners, the retractable means for holding at the rear corners being oriented towards the front of the cabinet and the retractable means for holding at the front corners being oriented inwardly, towards said lever, a pulley on the cabinet near the lever, a first said line passing from the lever and over the pulley to a first of said retractable means for holding, at a front corner, a second said line passing from the lever and over the pulley and through the first eyelet to a second of said retractable means for holding at a rear corner remote form said pulley, a third said line passing from the lever directly to a third of said retractable means for holding, at a front corner, and a fourth said line passing from the lever through the second eyelet to a fourth of said retractable means for holding, at a rear corner remote from said pulley, whereby pivoting said lever causes said plurality of lines to retract the respective retractable means for holding and release said castors.

* * * * *